(12) United States Patent
Izumi et al.

(10) Patent No.: US 8,821,952 B2
(45) Date of Patent: Sep. 2, 2014

(54) STABILIZED ACIDIFIED MILK PRODUCTS

(75) Inventors: Yoko Izumi, Kawasaki (JP); Irene Ding, Shanghai (CN)

(73) Assignee: CP Kelco ApS (DK)

( * ) Notice: Subject to any disclaimer, the term of this patent is extended or adjusted under 35 U.S.C. 154(b) by 162 days.

(21) Appl. No.: 13/196,194

(22) Filed: Aug. 2, 2011

(65) Prior Publication Data

US 2013/0034639 A1  Feb. 7, 2013

(51) Int. Cl.
*A23C 3/00* (2006.01)
*A23L 1/0524* (2006.01)
*A23C 9/154* (2006.01)

(52) U.S. Cl.
CPC ............ *A23C 9/1542* (2013.01); *A23V 2002/00* (2013.01)
USPC .......... 426/330.2; 426/34; 426/519; 426/522; 426/577; 426/580

(58) Field of Classification Search
USPC ........ 426/34, 330.2, 519, 520, 521, 522, 573, 426/577, 580, 588
See application file for complete search history.

(56) References Cited

U.S. PATENT DOCUMENTS

| | | | |
|---|---|---|---|
| 6,663,911 B2 | 12/2003 | Valli et al. |
| 6,855,363 B1 | 2/2005 | Buchholt |
| 2007/0087103 A1 | 4/2007 | Riis et al. |
| 2011/0020507 A1 | 1/2011 | Yuan et al. |

FOREIGN PATENT DOCUMENTS

| | | |
|---|---|---|
| DE | 102009019551 A1 | 12/2010 |
| EP | 0887020 A1 | 12/1998 |
| EP | 1069138 A1 | 1/2001 |
| WO | 2005016027 A1 | 2/2005 |
| WO | 2008148383 A1 | 12/2008 |
| WO | 2010089381 A2 | 8/2010 |
| WO | 2010115890 A1 | 10/2010 |
| WO | 2010129153 A3 | 11/2010 |

OTHER PUBLICATIONS

Mattia-Merino et al., "Acid-Induced Gelation of Milk Protein Concentrates with Added Pectin: Effect of Casein Micelle Dissociation", Food Hydrocolloids, Elsevier BV, NL, vol. 21, No. 5-6, Mar. 15, 2007, pp. 765-775.
"New Applications for Pectins", Food Tech Europe, Food Tech Europe, GB, Jan. 1, 1996, pp. 32-34.
PCT/EP2012/060130 International Search Report, Jul. 2, 2012.
PCT/EP2012/060130 Written Opinion of the International Searching Authority, Jul. 2, 2012.
Wearly, Douglas J., Centrifugation and Rheology as Indicators of Long Term Stability of an Acidified Protein Matrix, Thesis, the Ohio State University 2009.

*Primary Examiner* — Leslie Wong
(74) *Attorney, Agent, or Firm* — Sutherland Asbill & Brennan LLP

(57) ABSTRACT

Embodiments of the present application relate to mildly acidic milk drinks and methods for preparation of mildly acidic milk drinks having a pH between about 4.7 and about 5.4. The acidic milk drinks generally include a milk product and a low ester pectin (LM-pectin). The milk product may be present in an amount sufficient to provide milk solids non-fats (MSNF) content in an amount of less than or equal to about 8.5% by weight of the acidified milk drink. The LM-pectin may have a degree of esterification (DE) in the range of about 25% to about 45% and a degree of amidation in the range of about 10% to about 20%.

18 Claims, No Drawings

STABILIZED ACIDIFIED MILK PRODUCTS

BACKGROUND

Embodiments of the present invention relate to acidic milk products having improved stability. In particular, embodiments of the present invention relate to acidified milk products comprising a pectin stabilizer system.

Fermented milk products are among the most widely consumed foods in the world today, enjoyed by peoples of nearly all cultures and backgrounds. Yogurt (a milk product fermented with *L. bulgaricus* and *S. thermophilus* that typically has a pH of less than 5.0) is one of the most well-known fermented milk products.

Although yogurt remains a very popular comestible item, there also is a growing demand for liquid yogurt drinks. These yogurt drinks have the advantage of being more portable, convenient, and easier to consume than yogurt. In addition to yogurt drinks, other drinkable products containing milk as an ingredient, but with lower pH than fresh milk, also are popular. The low pH may, for example, result from blending milk with fruit products like orange or strawberry juice. The commercial versions of such drinks are typically heat-treated for obtaining a long shelf life.

Yogurt drinks often make use of stabilizers, such as pectin, against sedimentation of the milk solids that are found in the yogurt. Although pectin is a particularly good stabilizer at pH's of between 3.7 to 4.3, which are typical for commercial yogurt drinks providing excellent stabilization of milk solids, pectin may lose its efficacy for pH's between 4.3 to 5.4. Thus, as the pH of the acidified milk drink increases, the pectin becomes less effective as a stabilizer. In particular, pectins that are effective at stabilizing against sedimentation of milk solids at pH's between 3.7 to 4.3 may be required in significantly greater dosages to stabilize the milk solids with increasing pH, and may cause the acidified milk drink to become unacceptably thick. The increased thickness may occur at least in part due to the neutralization of the carboxylic acid groups on the pectin, as well as on the protein particles, by the protons, decreasing the surplus positive charge of the protein particles and increasing the tendency for the pectin to self-associate with $Ca^{2+}$ ions.

Not wishing to be bound by any theory, it is believed that protein protection may prevent aggregation of the milk proteins during acidification and thermal processing of the beverage. The proteins found in neutral pH milk are relatively small in micellular size and possess a net negative charge that allows the particles to repel one another and remain in solution. For example, caseins are protein micelles having spherical diameters of about 20 to 400 nm. As micelles, the caseins remain in colloidal form, suspended in the milk. However, maintaining the colloid state is dependent on the pH of the suspension. At a pH of about 5.0 (or even as high as 6.5 for a milk drink subjected to heat treatment), the casein starts to lose coherence and begins to precipitate out of the suspension. At a pH of about 4.5, precipitation of the casein is complete. Thus, for milk products formulated to a pH below 5.0 (such as yogurt and yogurt drinks) the casein particles are present in their precipitated phase rather than as colloidal micelles. Accordingly, pectin or other stabilizers may be required in milk drinks having an acidic or mildly acidic pH in order to prevent the casein particles from precipitating out of the milk and forming sediment.

Although beverages produced at the foregoing pH may be acceptable to some consumers, many consumers desire a more mildly acidic beverage having a less-tart taste. Accordingly, there is a need in the art for an acidified milk drink that is stable under mildly acidic conditions while still retaining a suitable consistency for consumers to drink.

SUMMARY

Embodiments of the present description provide a stable acidified milk drink having a pH between about 4.7 and about 5.1 and comprising a low ester pectin (LM-pectin) and a milk product, the LM-pectin having a degree of esterification (DE) in the range of about 25% to about 45% and a degree of amidation in the range of about 10% to about 20%. The milk product may be present in an amount sufficient to provide milk solids non-fats (MSNF) content in an amount of less than or equal to about 8.5% by weight of the acidified milk drink. Desirably, the acidified milk drink is characterized as a homogenous liquid having a consistency suitable for drinking and pouring.

Embodiments of the present description also provide a method for preparation of a stable acidified milk drink comprising: mixing a low ester pectin (LM-pectin) and water to obtain a LM-pectin mixture, wherein the LM-pectin has a degree of esterification (DE) in the range of about 25% to about 45% and a degree of amidation in the range of about 10% to about 20%; mixing a milk product and buffer salt to obtain a milk mixture; combining the LM-pectin mixture and milk mixture to obtain a milk drink; and acidifying the milk drink with an acidulant to a pH between about 4.7 and about 5.1 to obtain the acidified milk drink; wherein the acidified milk drink comprises the milk product in an amount sufficient to provide a milk solids non-fats (MSNF) content in an amount of less than or equal to about 8.5% by weight of the acidified milk drink, and wherein the acidified milk drink is characterized as a homogenous liquid having a consistency suitable for drinking and pouring.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Embodiments of the present invention relate to acidified milk drinks having improved stability, stabilizer systems for improving the stability of the acidified milk drinks, and methods for preparing the same. In particular, embodiments of the present invention comprise acidified milk drinks having improved stability imparted by a stabilizer system comprising a pectin capable of stabilizing the milk solids at higher pH's than have heretofore been achieved. Such stabilizer systems are particularly desirable for fruit-flavored or fruit juice-containing acidified milk drinks having a mildly acidic pH.

Acidified Milk Products

Acidified milk drink ("AMD") is synonymous with "milk drink," and is used herein to describe a beverage comprising a milk product and a stabilizer system at an acidic or mildly acidic pH. Desirably, "AMD" refers to drinkable products including a milk product and having a pH lower than that of fresh milk, irrespective of the manner by which the pH has been reduced. Accordingly, AMD includes, but is not limited to, yogurt drinks and cultured milks.

"Mildly acidic," is synonymous with "weakly acidic," and is used herein to describe a beverage having a pH from about 4.7 to about 5.4. In particular embodiments, the acidified milk drink has a pH from about 4.7 to about 5.3, from about 4.7 to about 5.1, from about 4.8 to about 5.1, from about 4.9 to about 5.1, or about 5.0. Those skilled in the art will appreciate that the pH of the beverage may be modified using any suitable food grade acidulant, non-limiting examples of which include citric acid, malic acid, lactic acid, phosphoric acid, and/or ascorbic acid.

The Milk Product

"Milk product," as used herein, includes milk based products that may comprise any suitable dairy milk product, non-limiting examples of which include a non-fat milk (e.g., skim milk), 2% fat content milk, whole milk, reconstituted dried or powdered milk, milk protein concentrates and/or isolates, and other forms of milk such as evaporated milk, condensed milk, and the like. The milk product also may comprise soy milk products (i.e., soy protein products), which may include soy milk protein concentrates and/or isolates, whole soy milk, and the like.

The term "acidified milk product," as used herein, refers to any milk-based product which has been acidified, including fermented milk products and acidified milk drinks. The term "acidified milk drink," as used herein, refers to any drinkable product based on acidified milk products, and generally can be divided into two categories: directly acidified milk drinks and fermented milk drinks. The directly acidified milk drinks generally are acidified by using an acid and/or fruit concentrate to acidify a milk product. The fermented milk drinks, such as yogurt drinks, are acidified by fermenting the milk product with a microorganism, such as *L. bulgaricus* and *S. thermophilus*.

In its most basic form, milk is a suspension of milk solids in a continuous aqueous phase. The milk solids include both fats and a non-fats portions commonly referred to as milk solids non-fats ("MSNF"). The MSNF include proteins (such as whey proteins and casein) and carbohydrates, as well as trace components like organic acids and minerals and vitamins. Embodiments of the present description desirably have a sufficient amount of milk product to provide a MSNF content in an amount up to about 8.5 wt %, in an amount up to about 6.5 wt %, in an amount up to about 5 wt %, or in an amount up to about 3 wt % of the milk drink. For example, in particular embodiments a sufficient amount of milk product is present to provide a MSNF content in the range of about 0.01 wt % to about 8.5 wt %, the range of about 0.1 wt % to about 6.5 wt %, the range of about 0.1 wt % to about 5 wt %, the range of about 0.2 wt % to about 3 wt %, or the range of 0.3 wt % to about 0.7 wt %.

In certain embodiments, the milk product may be more concentrated than raw milk, i.e., the protein content is greater than that of raw milk. Accordingly, in certain aspects the protein content of the acidified milk drink is more than about 5 wt % of the milk drink. For example, in certain aspects the protein content of the acidified milk drink is in the range of 5 wt % to about 10 wt % of the milk drink. Preferably, at least part of the protein in the milk product is proteins naturally occurring in milk, such as casein or whey protein. However, those skilled in the art will appreciate that in certain embodiments part of the protein may be proteins that are not naturally occurring in the milk.

Pectin

Pectins are natural materials that occur in most higher plant forms, forming the major structural components in the primary cell wall and middle lamella of young and growing plant tissues. The structure of pectin itself can be defined as 1,4-linked alpha-D-galactopyranosyluronic acid units in the $^4C_1$ conformation, with the glycosidic linkages arranged diaxially.

One critical characteristic of the pectin structure that has a significant affect on the pectin's behavior and performance is what fraction of the carboxyl groups attached to the galactopyranosyluronic acid units are esterified with methanol, which is characterized by the degree of esterification (DE). In commercial usage, pectins having a degree of esterification of less than 50% (i.e., less than 50% of the carboxyl groups are methylated to form methyl ester groups) are classified as low-ester pectins (or "LM-pectins") while those pectins having a degree of esterification of greater than 50%, (i.e., more than 50% of the carboxyl groups are methylated) are classified as high-ester pectins (or "HM-pectins").

In certain embodiments, the methyl-esterified carboxyl groups can be converted to amide groups by treating the pectin with ammonia under appropriate circumstances to obtain an amidated pectin. The degree of amidation (DA) is the content of amide groups expressed as a percentage of the number that is the sum of the number of methyl-esterified carboxyl groups plus the number of unesterified carboxyl groups plus the number of amide groups.

The pectins suitable for use in embodiments of the present description may comprise any pectin suitable for use in mildly acidic milk drinks. Desirably, the pectins comprise LM-pectins, a non-limiting example of which is commercially available and includes certain GENU® pectins (CP Kelco U.S., Inc.). Those of ordinary skill in the art should appreciate that the pectins may be used in either their purified or standardized form (and that the amount of pectin in the acidified milk drink may be adjusted accordingly). For example, the pectins may be standardized by sugar to eliminate performance variability between lots. Accordingly, in particular embodiments the pectins are present in the acidified milk drink in an amount from about 0.1 wt % to about 3 wt %.

It has surprisingly been discovered that pectins having a certain DE and/or DA are particularly effective for stabilizing acidified milk drinks having a pH in the range of about 4.7 to about 5.1. In particular embodiments, the pectins comprise LM-pectins having a DE of about 25% to about 45%, about 30% to about 40%, or about 33% to about 37%. In other particular embodiments, the pectins comprise LM-pectins having a DA of about 10% to about 20% or about 13% to about 17%. For example, in particular embodiments, the LM-pectins have a DE of about 30% to about 40% and a DA of about 10% to about 20%. In other particular embodiments the LM-pectins have a DE of about 33% to about 37% and a DA of about 13% to about 17%.

Those skilled in the art will appreciate that pectin manufacturers can, to some extent, control the DE and the DA of the pectin by appropriate processing steps and conditions. For example, after extraction a pectin can be de-esterified by treating the pectin with an acid or with an enzyme that hydrolyzes some of the methyl-esterified carboxyl groups to produce non-esterified carboxyl groups and methanol. While acids and some enzymes apparently pick the carboxyl groups to be de-esterified either at random or in a regular manner, other enzymes de-esterify in such a manner that blocks of consecutive free carboxyl groups occur in the molecules. The latter enzymes occur naturally in citrus fruit and may, to varying extents, create blocks in the pectin before the extraction process. Thus, a pectin manufacturer can to some extent manipulate not only the DE, but also the "blockiness" of the pectin. Thus, a pectin's effectiveness at stabilizing an acidified milk drink depends on a number of factors, including the DE, the DA, the pectin blockiness, the concentration of $Ca^{2+}$ ions, the pH, the presence of other dissolved materials, the temperature, and other possible factors.

While not intending to being limited by theory, it is believed that embodiments of acidified milk drinks with a relatively high pH range (and thus, less acidic taste and sensory characteristics) can be formulated by using a pectin that: has a degree of esterification lower than that of pectins previously recognized as being suitable for stabilizing milk drinks; a degree of amidation between 10 to 20%; and is extracted from a citrus source.

Optional Ingredients

In some embodiments it is particularly desirable to provide an acidified milk drink having a fruit flavor. The fruit flavor may be provided by including one or more fruit ingredients in the acidified milk drink, non-limiting examples of which include fresh fruits, frozen fruits, fruit purees, frozen fruit purees, fruit juices, frozen fruit juices, fruit puree concentrates, frozen fruit puree concentrates, fruit juice concentrates, and/or frozen fruit juice concentrates. Such fruit ingredients are well known to those of ordinary skill in the art.

Other ingredients which also may be added to the acidified milk drinks embodied herein include buffer salts (e.g., tri-sodium citrate); other flavorings (e.g., chocolate, vanilla, strawberry, etc.); natural or artificial sweeteners, sugars, or corn syrups; vegetable purees or vegetable juices; natural or artificial preservatives; soluble or insoluble fibers; and/or nutritional additives such as vitamins, minerals, and herbal supplements.

In particular embodiments the acidified milk drink further comprises a buffer salt in an amount up to about 0.5 wt %, from about 0.05 to about 0.5 wt %, about 0.1 to about 0.5 wt %, or from about 0.2 to about 0.5 wt % of the milk drink. Non-limiting examples of suitable buffer salts are known to those skilled in the art and include tri-sodium citrate and sodium hexametaphosphate. For example, in an embodiment the acidified milk drink further comprises the tri-sodium citrate buffer salt present in an amount of about 0.3 wt % of the milk drink. Not wishing to be bound by any theory, it is believed that certain buffer salts may further improve the stability of the acidified milk drinks provided herein.

Methods of Preparing Acidified Milk Drinks

Also provided herein are methods for preparing acidified milk drinks. The process generally comprises mixing the LM-pectin and water to obtain a LM-pectin mixture, providing a milk product; combining the LM-pectin mixture and milk product to obtain a milk drink; and acidifying the milk drink with an acidulant to a pH between about 4.7 and about 5.1 to obtain the acidified milk drink. Desirably, embodiments of the method further comprise pre-heating and homogenizing the acidified milk drink; heat-treating the acidified milk drink; and thereafter cooling the acidified milk drink.

In particular embodiments, the step of mixing the LM-pectin mixture may further comprise heating the mixture to a temperature in the range of about 20° C. to about 60° C. Alternatively, the step of mixing the LM-pectin mixture may be conducted at about room temperature. In still other embodiments, the step of mixing the LM-pectin and water comprises heating the LM-pectin mixture to a temperature in the range of about 70° C. to about 80° C.

In certain embodiments, the step of providing the milk product comprises mixing a milk powder and water while heating the milk product to a temperature in the range of about 20° C. to about 60° C. Alternatively, the step of providing the milk product is conducted by mixing a milk product and buffer salt, for example, either at about room temperature or while heating the milk product and buffer salt mixture to a temperature in the range of about 20° C. to about 60° C.

In further embodiments, the step of heat-treating the acidified milk drink comprises pasteurizing or sterilizing the acidified milk drink, for example, by an ultra high temperature sterilization, and thereafter rapidly cooling the acidified milk drink.

Embodiments of the invention will now be described in more detail with respect to the following, specific, non-limiting examples.

EXAMPLES

In the Examples below, several methods were used to evaluate the beverage stability. These include measuring the elastic modulus (G') and the viscosity. The following describes the techniques used to make these evaluations.

Elastic Modulus (G')

Dynamic rheological measurements were performed with a Vilastic V-E Viscoelasticity Analyzer (Vilastic Scientific, Inc., Austin, Tex.) equipped with a circulating water bath temperature controller at 20° C. Tests were carried out with a precision capillary tube (0.0537 cm inner radius with a tube length of 6.137 cm). Elastic modulus was measured at a frequency of 1 Hz (6.28 rad/s) and a straing of 0.3 (30%). The integration time for measurement was 5 seconds and each sample was analyzed using the average elastic modulus (G') data points.

Viscosity

The viscosity was measured using a UL Adaptor. The temperature of the sample was adjusted to 10° C. prior to the viscosity check, about 16 mL of sample was added into the UL Adapter tube and placed in the viscometer, the rotation speed and reading time were set on the viscometer, and rotation of the spindle was begun to analyze the viscosity.

Sedimentation

Sedimentation was measured by centrifuging samples at room temperature at 3000 G for 20 min. After centrifuging, the liquid was decanted from the tube and the sediment was allowed to sit for 30 min. The sediment weight was subsequently measured and the % of sedimentation was calculated.

Example 1

Three heat-sterilized acidified milk drinks were prepared by (1) mixing the components of A and heating to a temperature of 70-80° C. for about 15 minutes to form a pectin solution, (2) mixing the components of B and heating to a temperature of about 60° C. for about 5 minutes to obtain a milk solution, (3) combining the pectin solution and milk solution of steps (1) and (2), respectively, (4) adjusting the pH of the solution to about 5.0 (±0.1) by adding 50 (W/V) citric acid solution, (5) heating the solution to a temperature of about 70° C. and then subsequently processing by UHT at about 140° C. for about 5 seconds, (6) cooling the solution to room temperature.

The formulations of components in the acidified milk drinks is summarized in the following table. The pectin used was a GENU® LM-pectin having a DE of 35% and a DA of 15%.

|   |   | Sample No. | | | | | |
|---|---|---|---|---|---|---|---|
|   |   | No1 | | No2 | | No0 control | |
|   | Ingredients | wt % | g/5000 g | wt % | g/5000 g | wt % | g/5000 g |
| A | LM-pectin | 0.5 | 25 | 0.5 | 25 | 0 | 0 |
|   | Sugar | 10 | 500 | 10 | 500 | 10 | 500 |

-continued

|   | Ingredients | No1 wt % | No1 g/5000 g | No2 wt % | No2 g/5000 g | No0 control wt % | No0 control g/5000 g |
|---|---|---|---|---|---|---|---|
|   | Water | 59.2 | 2960 | 59 | 2950 | 59.5 | 2975 |
| B | Sodium citrate | 0.3 | 15 | 0.5 | 25 | 0.5 | 25 |
|   | Skimmed milk powder | 5 | 250 | 5 | 250 | 5 | 250 |
|   | Water | 25 | 1250 | 25 | 1250 | 25 | 1250 |
| C | 50% (W/V) citric acid soln. | to pH 5.0 | 26.8 ml | to pH 5.0 | 30.0 ml | to pH 5.0 | 30.8 ml |
|   | Total | 100 | 5000 | 100 | 5000 | 100 | 5000 |
|   | pH before adding C |   | 7.15 |   | 7.31 |   | 7.57 |

The samples were then evaluated by comparing the G' when measured at 20° C., the amount of sedimentation after centrifuge, and the appearance after keeping the samples overnight at 4° C. The results are summarized below.

| Sample No. | G' | Sedimentation | Appearance |
|---|---|---|---|
| 0 | Below the sensitivity | 1.06% | x Sedimentation was observed |
| 1 | 0.1385 | 2.45% | o Homogenous, no sedimentation, no phase separation and no jellification |
| 2 | 0.0700 | 2.96% | o Homogenous, no sedimentation, no phase separation and no jellification |

In addition, the viscosity of the samples was measured at 10° C. using a Brookfield model DV-III UL adaptor. The results are summarized below.

| RPM | AMD No. 0 | AMD No. 1 | AMD No. 2 |
|---|---|---|---|
| 10.00 |   | 29.09 |   |
| 20.00 |   | 23.69 |   |
| 30.00 |   | 21.20 | 10.10 |
| 40.00 |   | 19.72 | 9.37 |
| 50.00 |   | 18.30 | 8.94 |
| 60.00 | 2.65 | 17.15 | 8.65 |
| 70.00 | 2.57 | 16.50 | 8.31 |
| 80.00 | 2.47 | 15.75 | 8.14 |
| 90.00 | 2.40 | 15.23 | 8.13 |
| 100.00 | 2.49 | 14.76 | 8.07 |

The sample without pectin was phase-separated and would thus be unappealing to consumers, while the two samples with pectin were homogeneous. The relatively low G' and viscosities of the pectin-containing samples were consistent with this observation. Although the stability of the pectin-containing samples was accompanied by a moderate viscosity, it by no means compromised the oral perception of the drinks.

Example 2

Four heat-sterilized acidified milk drinks were prepared with the formulations in the table below using the method described in Example 1. GENU® LM-pectin having a DE of 35% and a DA of 15% obtained from various lots was used to compare the consistency of the pectins.

|   | Ingredients | Lot SK01045 wt % | Lot SK01045 g/5000 g | Lot SK91195 wt % | Lot SK91195 g/5000 g | Lot SK92073 wt % | Lot SK92073 g/5000 g | Lot SK93001 wt % | Lot SK93001 g/5000 g |
|---|---|---|---|---|---|---|---|---|---|
| A | LM-pectin (SK01045) | 0.5 | 25 | 0 | 0 | 0 | 0 | 0 | 0 |
|   | LM-pectin (SK91195) | 0 | 0 | 0.5 | 25 | 0 | 0 | 0 | 0 |
|   | LM-pectin (SK92073) | 0 | 0 | 0 | 0 | 0.5 | 25 | 0 | 0 |
|   | LM-pectin (SK93001) | 0 | 0 | 0 | 0 | 0 | 0 | 0.5 | 25 |
|   | Sugar | 10 | 500 | 10 | 500 | 10 | 500 | 10 | 500 |
|   | Water | 59 | 2950 | 59.2 | 2960 | 59 | 2950 | 59.5 | 2975 |
| B | Sodium citrate | 0.5 | 25 | 0.3 | 15 | 0.5 | 25 | 0.5 | 25 |
|   | Skimmed milk powder | 5 | 250 | 5 | 250 | 5 | 250 | 5 | 250 |
|   | Water | 25 | 1250 | 25 | 1250 | 25 | 1250 | 25 | 1250 |
| C | 50% (W/V) citric acid soln. | to pH 5.0 |   | to pH 5.0 |   | to pH 5.0 |   | to pH 5.0 |   |
|   | Total | 100 | 5000 | 100 | 5000 | 100 | 5000 | 100 | 5000 |
|   | Original pH |   | 7.31 |   | 7.30 |   | 7.32 |   | 7.31 |
|   | Adjusted pH |   | 5.01 |   | 5.00 |   | 5.03 |   | 5.01 |
|   | After UHT |   | 5.08 |   | 5.08 |   | 5.10 |   | 5.07 |

The heat-sterilized samples were observed after about 24 hours of storage and again after about 3 days storage at room temperature.

the samples using a Brookfield viscometer having a spindle type LV No. 2. The appearance of the samples was further evaluated after 8 days of storage at 4° C.

|  |  | No. 1 | No. 2 | No. 3 | No. 4 | No. 5 |
|---|---|---|---|---|---|---|
| Original pH |  | 7.20 | 7.20 | 7.22 | 7.15 | 7.01 |
| Adjusted pH (Target pH 5.0) |  | 4.99 | 4.97 | 4.96 | 4.99 | 4.98 |
| Viscosity at 10° C. | 0.3 rpm | 499.9 | 799.8 | 1300 | 2359.5 | 80283 |
| (*) | 3.0 rpm | 30.0 | 110.0 | 469.9 | 4379 | — |
|  | 30.0 rpm | 28.0 | 39.0 | 123.0 | 789.8 | — |
|  | 100.0 rpm | 23.7 | 30.9 | 60.9 | — | — |
| Out looking (*) |  | Sedimentation | Sedimentation | Homogenous Liquid | Jellified very softly | Jellified softly |

| Sample lot | SK01045 | SK91195 | SK92073 | SK93001 |
|---|---|---|---|---|
| % sediment (in centrifuge) | 4.89 | 4.89 | 5.11 | 4.79 |
| viscosity (ULA 60 rpm), mPa · s | 6.55 | 5.55 | 5.29 | 5.91 |
| pH | 5.08 | 5.08 | 5.10 | 5.07 |
| mouthfeel after 24 hours | smooth | smooth | smooth | smooth |
| appearance after 3 days, room temperature | slight wheyoff | slight wheyoff | slight wheyoff | slight wheyoff |

The samples all had consistent appearances and moderate viscosities. None of the samples exhibited the gross phase separation observed in the reference sample of Example 1. However, several of the samples exhibited a slight whey off (in other words, there was a slight separation of whey on the upper surface of the acidified milk drink).

Example 3

Five heat-sterilized acidified milk drink were prepared by (1) mixing the components of A and heating to a temperature of 70-80° C. for about 15 minutes to form a pectin solution, (2) mixing the components of B and heating to a temperature of about 60° C. for about 5 minutes to obtain a milk solution, (3) combining the pectin solution and milk solution of steps (1) and (2), respectively, (4) adjusting the pH of the solution to about 5.0 (±0.1) by adding 50% (W/V) citric acid solution, (5) pre-heating the solution to a temperature of about 70-80° C. and then homogenizing the solution at 150 kgf/cm², (6) pasteurizing the solution at 95° C. for about 5 minutes; and (7) cooling the solution to about 30° C. in a water bath.

The formulations are summarized below and were prepared with varying amounts of GENU® LM-pectin having a DE of 35% and a DA of 15% to compare the effect of the amount of the pectin on the stability of the formulation.

|  | Sample No. | No. 1 | No. 2 | No. 3 | No. 4 | No. 5 |
|---|---|---|---|---|---|---|
| A | LM-pectin | 0.1 | 0.3 | 0.5 | 0.7 | 1.0 |
|  | Sugar | 10.0 | 10.0 | 10.0 | 10.0 | 10.0 |
|  | Water | 59.4 | 59.2 | 59.0 | 58.8 | 58.6 |
|  | Sodium Citrate | 0.5 | 0.5 | 0.5 | 0.5 | 0.5 |
| B | Skimmed milk (Morinaga Milk) | 5.0 | 5.0 | 5.0 | 5.0 | 5.0 |
|  | Water | 25.0 | 25.0 | 25.0 | 25.0 | 25.0 |
| C | 50% Citric acid soln. (W/V) | To pH 5.0 | To pH 5.0 | To pH 5.0 | To pH 5.0 | To pH 5.0 |

The heat-sterilized samples were evaluated after about 48 hours of storage at room temperature by characterizing the appearance of the samples and by measuring the viscosity of the samples using a Brookfield viscometer having a spindle type LV No. 2. The appearance of the samples was further evaluated after 8 days of storage at 4° C.

The pectin dosage was determined to require a compromise between two characteristics—stability and fluidity. Too little pectin resulted in beverage instability, as evidenced by sedimentation and a less hazy supernatant that formed during the storage. Too much pectin resulted in unattractively thick beverages having too little fluidity that may be perceived as a gel rather than a drink, as evidenced by the significantly higher viscosities.

Example 4

Five heat-sterilized acidified milk drinks were prepared using the formulations summarized below by the method of Example 3. GENU® LM-pectin having a DE of 35% and a DA of 15% was used in each formulation and the MSNF content of each formulation was varied by varying the amount of skimmed milk in each sample.

|  |  | No. 1 | No. 2 | No. 3 | No. 4 | No. 5 |
|---|---|---|---|---|---|---|
| A | GENU® LM-pectin | 0.5 | 0.5 | 0.5 | 0.5 | 0.5 |
|  | Sugar | 10.0 | 10.0 | 10.0 | 10.0 | 10.0 |
|  | Water | 63.5 | 63.0 | 61.0 | 59.0 | 56.0 |
| B | Skimmed milk (Morinaga Milk) | 0.5 | 1.0 | 3.0 | 5.0 | 8.0 |
|  | Sodium Citrate | 0.5 | 0.5 | 0.5 | 0.5 | 0.5 |
|  | Water | 25.0 | 25.0 | 25.0 | 25.0 | 25.0 |
| C | 50% Citric acid soln. (W/V) | To pH 5.0 | To pH 5.0 | To pH 5.0 | To pH 5.0 | To pH 5.0 |
| Total |  | 100.0 | 100.0 | 100.0 | 100.0 | 100.0 |

The pH before and after acidification, and the appearance and viscosity of the samples at various points throughout the process are summarized in the tables below.

|  | No. 1 | No. 2 | No. 3 | No. 4 | No.5 |
|---|---|---|---|---|---|
| Original pH before acidification | 7.20 | 7.22 | 7.17 | 6.98 | 6.86 |
| Just after pH adjusting | 5.00 | 4.98 | 5.00 | 5.00 | 4.96 |

|  | No. 1 | No. 2 | No. 3 | No. 4 | No. 5 |
|---|---|---|---|---|---|
| Before acidification | Almost transparent | Almost transparent | A little opaque | Clouded | Clouded |
| Just after pH adjusting | Clouded | Clouded | Clouded | Clouded | Clouded |

-continued

|  | No. 1 | No. 2 | No. 3 | No. 4 | No. 5 |
|---|---|---|---|---|---|
| Homogenization | Homogenous | Homogenous | Homogenous | Homogenous | Homogenous |
| Pasteurization & cooling | Homogenous | Homogenous | Homogenous | Sedimentation | Sedimentation |
| Storage at 4 (Day 3) | Homogenous | Homogenous | Homogenous | Sedimentation | Sedimentation |
|  | Liquid | Liquid | Liquid | Liquid | Liquid |
| Viscosity at 10° C. (30 rpm) | 6.00 mPa/s | 6.84 mPa/s | 13.3 mPa/s | 499.9 mPa/s | Very high |

As can be seen from the foregoing, it became increasingly difficult to prepare a stable and fluid beverage as the MSNF content increased. The beverages having 0.5, 1.0 and 3% MSNF were stable and attractive, while the beverages having 5% MSNF and 8% MSNF showed sedimentation and had an unattractively high viscosity.

Example 5

Heat-sterilized acidified milk drinks were prepared using the formulation summarized below by the method of Example 3. GENU® LM-pectin having a DE of 35% and a DA of 15% was used in each formulation and the pH of each formulation was adjusted to either 3.6, 3.8, 4.0, 4.2, 4.4, 4.6, 4.8, 5.0, 5.2, or 5.4.

|  | Ingredient | % |
|---|---|---|
| A | GENU pectin type LM101AS-J | 0.5 |
|  | Sugar | 10.0 |
|  | Water | 20.0 |
| B | Skimmed milk (Morinaga Milk) | 3.0 |
|  | Water | 25.0 |
| C | Water | 41.0 |
| D | Sodium Citrate | 0.5 |
| E | 50% Citric acid soln. (W/V) | To target pH |
| Total |  | 100.0 |

The viscosity, sedimentation, and median particle size were measured and are summarized in the table below. In addition, the appearance and taste of the drinks was evaluated and is summarized in the table.

| pH | Viscosity | Sedimentation | Particle size (median φ) | Comment |
|---|---|---|---|---|
| pH 3.6 | 11.2 mPa/s | 9.18% | 10.7 | Tastes too sour |
| pH 3.8 | 7.82 mPa/s | 7.17% | 7.0 | Tastes too sour |
| pH 4.0 | 9.72 mPa/s | 3.93% | 1.6 | Tastes too sour |
| pH 4.2 | 12.8 mPa/s | 1.59% | 0.4 | Tastes too sour |
| pH 4.4 | 15.2 mPa/s | 2.20% | 0.3 | Sour taste |
| pH 4.6 | 14.2 mPa/s | 0.76% | 0.3 | A little sour taste |
| pH 4.8 | 14.9 mPa/s | 0.71% | 0.3 | Nice balance of sweet and sour tastes |
| pH 5.0 | 12.1 mPa/s | 0.67% | 0.3 | Nice balance of sweet and sour tastes |
| pH 5.2 | 61.8 mPa/s | 11.53% | 25.4 | Big sedimentation |
| pH 5.4 | 9.82 mPa/s | 1.42% | 105 | Feel less milk solids than other samples |

Subject to individual taste preferences, beverages of pH less than 4.6 may be considered too sour. The beverages of pH 4.6, 4.8, and 5.0 were considered to have acceptable taste and texture, while the beverages of pH 5.2 and 5.4 were considered to be unappealing.

Example 6

Seven heat-sterilized acidified milk drink were prepared using the formulations summarized below by the method of Example 3. GENU® LM-pectin having a DE of 35% and a DA of 15% was used in each formulation and both the buffer type (sodium citrate or sodium tri-polyphosphate, anhydrate) and amount of buffer type were varied.

|  | Ingredient | Buffer type 1 Sodium Citrate % | Buffer type 2 Sodium Tripolyphosphate, anhydrate % |
|---|---|---|---|
| A | GENU ® LM-pectin | 0.5 | 0.5 |
|  | Sugar | 10.0 | 10.0 |
|  | Water | 20.0 | 20.0 |
| B | Skimmed milk (Morinaga Milk) | 3.0 | 3.0 |
|  | Water | 25.0 | 25.0 |
| C | Water | 41.0 (*) | 41.0 (*) |
| D | Sodium Citrate | 0, 0.1, 0.3, 0.5 or 0.7 | — |
|  | Sodium Tri polyphosphate, anhydrate | — | 0.1 or 0.3 |
| E | 50% Citric acid soln. (W/V) | To pH 5.0 | To pH 5.0 |
| Total |  | 100.0 | 100.0 |

(*) Adjust water to be 100% as the total depends on buffer usage level.

The viscosity, sedimentation, and median particle size were measured and are summarized in the table below. In addition, the appearance and taste of the drinks was evaluated and is described in the table.

| Buffer | Viscosity mPa/s | Sedimentation | Particle size (median φ) | Comment |
|---|---|---|---|---|
| Na Citrate 0% | 1780 (0.3 rpm) | 20.9% | 11.3 | A lot of aggregations |
| Na Citrate 0.1% | 7.82 (0.3 rpm) | 3.37% | 1.2 | Softly jellified |
| Na Citrate 0.3% | 18.8 (30 rpm) | 0.44% | 0.3 | OK, No sedimentation after 2 weeks storage at 4° C. |
| Na Citrate 0.5% | 8.88 (30 rpm) | 0.68% | 0.3 | OK, A very little sedimentation after 2 weeks storage at 4° C. |
| Na Citrate 0.7% | 6.58 (30 rpm) | 3.90% | 2.5 | A lot of sedimentations after 2 weeks storage at 4° C. Pretty salty taste |
| Phosphate 0.1% | — | 1.07% | 0.9 | Softly jellified |
| Phosphate 0.3% | 69.0 (0.3 rpm) | 1.13% | 0.4 | OK, No sedimentation after 2 weeks storage at 4° C. No salty taste |

The foregoing results indicate that formulations having 0.3% sodium citrate had slightly improved characteristics than those having 0.5% sodium citrate. Formulations having sodium tri-poly phosphate also had acceptable characteristics at a concentration of 0.3%.

Example 7

Five heat-sterilized acidified milk drinks were prepared by the method of Example 3 using the formulations summarized in the table below. Different types of GENU® LM-pectin were used to evaluate the effect of the DE and DA on the beverages.

| Ingredient | No. 1 % | No. 2 % | No. 3 % | No. 4 % | No. 5 % |
|---|---|---|---|---|---|
| A | GENU® LM-pectin (DE: 35, DA: 15) | 0.5 | — | — | — | — |
| | GENU® LM-pectin (DE: 35, DA: 0) | — | 0.5 | — | — | — |
| | GENU® LM-pectin (DE: 38, DA: 12) | — | — | 0.5 | — | — |
| | GENU® LM-pectin (DE: 38, DA: 0) | — | — | — | 0.5 | — |

-continued

| Ingredient | No. 1 % | No. 2 % | No. 3 % | No. 4 % | No. 5 % |
|---|---|---|---|---|---|
| | GENU® LM-pectin (DE: 26, DA: 22) | — | — | — | — | 0.5 |
| | Sugar | 10.0 | 10.0 | 10.0 | 10.0 | 10.0 |
| | Water | 59.0 | 59.0 | 59.0 | 59.0 | 59.0 |
| B | Skimmed milk (Morinaga Milk) | 5.0 | 5.0 | 5.0 | 5.0 | 5.0 |
| | Sodium Citrate | 0.5 | 0.5 | 0.5 | 0.5 | 0.5 |
| | Water | 25.0 | 25.0 | 25.0 | 25.0 | 25.0 |
| D | 50% Citric acid soln. (W/V) | To pH 5.0 | To pH 5.0 | To pH 5.0 | To pH 5.0 | To pH 5.0 |
| Total | | 100.0 | 100.0 | 100.0 | 100.0 | 100.0 |

The pH of the formulations both before acidification, after acidification, and after 24 hours of storage at 4° C. is summarized in the following table.

| Pectin type of the AMD sample | Original pH before acidification | Just after pH adjusting | After 24 hours at 4° C. |
|---|---|---|---|
| GENU® LM-pectin (DE: 35, DA: 15) | 7.26 | 5.00 | 4.97 |
| GENU® LM-pectin (DE: 35, DA: 0) | 6.53 | 5.00 | 4.95 |
| GENU® LM-pectin (DE: 38, DA: 12) | 7.13 | 4.99 | 4.99 |
| GENU® LM-pectin (DE: 38, DA: 0) | 6.70 | 4.90 | 4.70 |
| GENU® LM-pectin (DE: 26, DA: 22) | 7.26 | 4.99 | 4.76 |

The effect of acidification, pasteurization, and storage on each of the formulations was observed and is summarized in the following table.

| Pectin type of the AMD sample | pH adjusting (to pH 5.0) | After Pasteurization (95° C. for 5 min.) | After 24 hours at 4° C. |
|---|---|---|---|
| GENU® LM-pectin (DE: 35, DA: 15) | It was found that very thin and jelly like substances from the beginning of acidification. But it was disappeared while mixing. | Particle size looked bigger than usual AMD | Homogenous liquid |
| GENU® LM-pectin (DE: 35, DA: 0) | Small pieces of jelly were created from just beginning of acidification. The sample becomes to be opaque at pH 5.4. Then, it turns to be pretty thick and to be white | Particle size looked very small. Looked stable | Jellified weakly |
| GENU® LM-pectin (DE: 38, DA: 12) | Similar to GENU® LM-pectin (DE: 35, DA: 15), but the size of jelly like substances is smaller. | Particle size looked bigger than usual AMD | Liquid, Phase separation |
| GENU® LM-pectin (DE: 38, DA: 0) | Similar to GENU® LM-pectin (DE: 35, DA: 0), but it is thicker than the other 4 samples. | Particle size looked very small. Looked stable, Thicker than others | Jellified weakly |
| GENU® LM-pectin (DE: 26, DA: 22) | Similar to GENU® LM-pectin (DE: 35, DA: 0) | Particle size looked bigger than usual AMD | Jellified weakly (Harder than GENU® LM-pectin (DE: 35, DA: 0) and GENU® LM-pectin (DE: 38, DA: 0)) |

As can be seen from the foregoing, both the DE and DA of the pectin effected the stability and fluidity of the formulations. GENU® LM-pectin (DE: 35, DA: 15) was observed as being the most effective at stabilizing the acidified milk drink while also maintaining the fluidity of the beverage.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present application should be assessed as that of the appended claims and any equivalents thereof.

We claim:

1. A method for preparing an acidified milk drink comprising:
    mixing a low ester pectin (LM-pectin) and water to obtain a LM-pectin mixture, wherein the LM-pectin has a degree of esterification (DE) in the range of about 25% to about 45% and a degree of amidation in the range of about 10% to about 20%;
    mixing a milk product and a buffer salt to obtain a milk mixture;

combining the LM-pectin mixture and milk mixture to obtain a milk drink; and acidifying the milk drink with an acidulant to a pH between about 4.7 and about 5.1 to obtain the acidified milk drink;

wherein the acidified milk drink comprises the milk product in an amount sufficient to provide a milk solids non-fats (MSNF) content in an amount of less than or equal to about 8.5% by weight of the acidified milk drink, wherein the acidified milk drink is characterized as a homogenous liquid having a consistency suitable for drinking and pouring as characterized by a viscosity of less than about 100 mPa/s when measured at a temperature of about 10° C.

2. The method of claim 1, wherein the step of mixing the milk product and the buffer salt further comprises mixing a milk powder and water to form the milk product while heating the milk product to a temperature in the range of about 20° C. to about 60° C.

3. The method of claim 1, wherein the step of mixing the milk product and the buffer salt is conducted at about room temperature.

4. The method of claim 1, wherein the step of mixing the LM-pectin and water further comprises heating the mixture to a temperature in the range of about 70° C. to about 80° C.

5. The method of claim 1, further comprising:
pre-heating and homogenizing the acidified milk drink;
heat-treating the acidified milk drink; and
thereafter cooling the acidified milk drink.

6. The method of claim 5, wherein the step of heat-treating the acidified milk drink comprises sterilizing or pasteurizing the acidified milk drink.

7. The method of claim 1, wherein the acidified milk drink has a pH in the range of about 4.8 to about 5.0.

8. The method of claim 1, wherein the acidified milk drink has a pH of about 5.0.

9. The method of claim 1, wherein the LM-pectin has a degree of esterification in the range of about 30% to about 40%.

10. The method of claim 1, wherein the pectin has a degree of esterification in the range of about 33% to about 37%.

11. The method of claim 1, wherein the pectin has a degree of amidation in the range of about 13% to about 17%.

12. The method of claim 1, wherein the milk product is present in an amount sufficient to provide a MSNF content in the range of about 0.1 wt % to about 6.5 wt % of the acidified milk drink.

13. The method of claim 1, wherein the milk product is present in an amount sufficient to provide a MSNF content in the range of about 0.3 wt % to about 5 wt % of the acidified milk drink.

14. The method of claim 1, wherein the milk product is present in an amount sufficient to provide a MSNF content of about 3 wt % of the acidified milk drink.

15. The method of claim 1, wherein the buffer salt is present in an amount from about 0.2 wt % to about 0.5 wt % of the acidified milk drink.

16. The method of claim 1, wherein the buffer salt comprises tri-sodium citrate, potassium hexametaphosphate, or a combination thereof.

17. The method of claim 1, wherein the buffer salt comprises tri-sodium citrate present in an amount of about 0.3 wt % of the acidified milk drink.

18. The method of claim 1, wherein the acidified milk drink is characterized by a viscosity of less than about 30 mPa/s when measured at a temperature of about 10° C.

* * * * *